Feb. 5, 1946.  H. PASCHKE ET AL  2,394,524
METHOD OF MAKING CORK COMPOSITION CARTRIDGE PLUGS
Filed April 30, 1943

Inventor
Herbert Paschke
John H. Wiley
by Walter F. Kaufman
Attorney

Patented Feb. 5, 1946

2,394,524

UNITED STATES PATENT OFFICE 2,394,524

METHOD OF MAKING CORK COMPOSITION CARTRIDGE PLUGS

Herbert Paschke and John W. Wiley, Lancaster, Pa., assignors to Armstrong Cork Company, Lancaster, Pa., a corporation of Pennsylvania Application April 30, 1943, Serial No. 485,214

5 Claims. (Cl. 18—59)

This invention relates to a method of making cork composition cartridge plugs and, more particularly, to a method of making cork composition cartridge plugs composed of a relatively soft frangible core and a relatively hard, thin protective coating or shell covering the core.

Heretofore, cork composition cartridge plugs have been composed of a core formed of coarsely ground baked cork particles of relatively low tensile strength held together by a binder. A hard outer ring composed of finely ground cork of relatively high tensile strength held together by a binder has been placed about the readily frangible core and cemented thereto. In practice, the core was formed from a mat of relatively low tensile strength and the hard outer shell was cut from a mat of relatively high tensile strength and cemented to the core. This method of forming cork composition cartridge plugs is very expensive for the procedure described results in a large loss of material. In addition, an excessive number of operations are required to form the core and the shell, and to adhere the shell to the core and generally skilled labor is required to perform such operations.

The chief object of this invention is to provide an improved method of forming cartridge plugs. An object of this invention is to provide a method of forming cork composition cartridge plugs which is economical and readily performed by unskilled labor. A further object is to provide a method of making cork composition cartridge plugs in which excessive loss or waste is obviated. A still further object is to provide a method of making cork composition cartridge plugs which greatly reduces the cost of the finished product.

This invention relates to a method of making cork composition cartridge plugs in which the steps comprise disposing plastic cork composition about a shaped core, shaping the plastic composition to the desired contour, and hardening the composition to form a thin, relatively hard coating about said core.

The attached drawing illustrates a method of carrying out the present invention, in which Figure 1 is a view in elevation of a cork composition cartridge plug prepared by the method of our invention;

Figure 1:
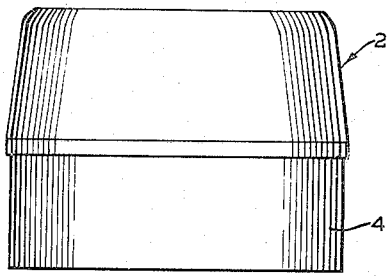
Figure 2:
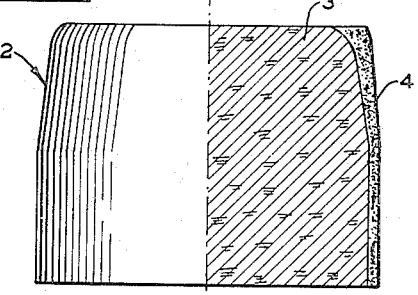
Figure 2 is a view in elevation partially broken away illustrating the shaped core wrapped with a plastic, moldable sheet of cork composition.
Figure 3:
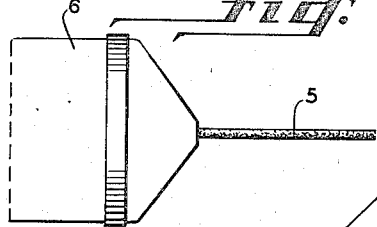
Figure 3 is a diagrammatic view of extruding apparatus for extruding a strip or sheet of plastic cork composition.
Figure 4:
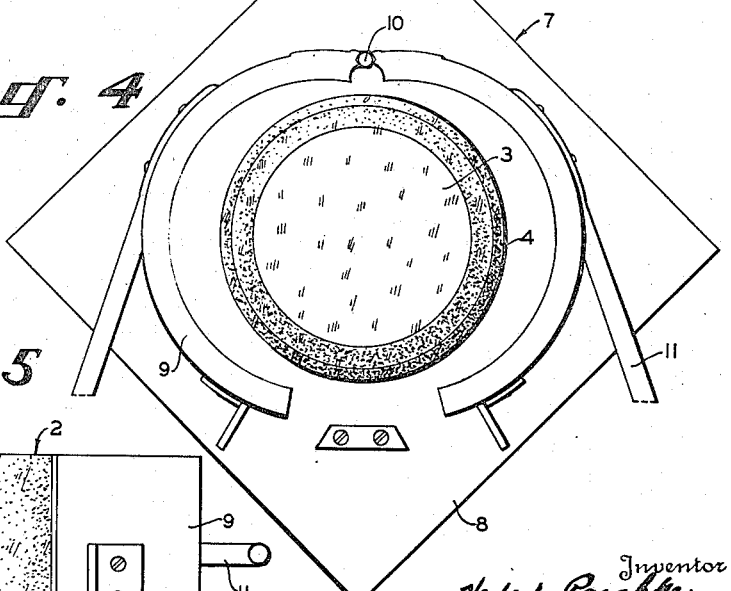
Figure 4 is a plan view of a mold for shaping the plastic cork composition to the desired contour.
Figure 5:
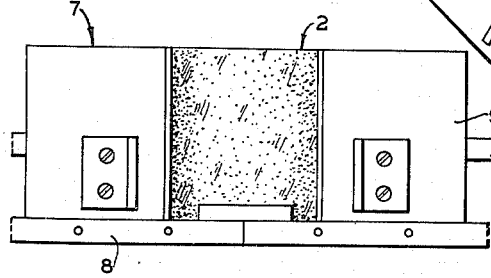
Figure 5 is a view in elevation of the mold illustrated in Figure 4.

Referring to the drawing, there is illustrated a cork composition cartridge plug designated generally at 2. The cartridge plug is composed of a core 3 formed of any relatively soft material, such as coarsely ground cork of relatively low tensile strength or any similar material, adapted to be quickly broken up or otherwise destroyed upon explosion of the charge, held together by a binder. Preferably, the core 3 is formed from corkboard-cork particles held together in the form of an integral mass by resin exuded during the baking operation or by an added binder. The core 3 is covered by a coating or layer 4, preferably, a composition of high tensile strength composed of finely ground cork, held together by a suitable binder.

In forming the cork cartridge plug of our invention, preferably, a sheet, strip or ribbon 5 of plastic cork composition is formed by any suitable extruding device 6. The strip 5 is wrapped about core 3 and the wrapped core is placed in a mold designated generally at 7. Mold 7 includes a base 8, and walls 9 connected by a suitable hinge 10 so as to be movable inwardly and outwardly about the core. If desired, a top plate (not shown) may be provided to close the mold. The wrapped core is placed in the mold 7 and the walls 9 are closed thereabout by any suitable means such as handles 11 to shape the wrapped strip 5 to desired contour. The article is then removed from the mold and disposed on a rack to dry if a volatile solvent type binder for the cork composition has been used; if a heat settable binder has been used in forming the plastic cork composition, the shaped articles may be disposed in ovens and subjected to heat to set the binder. It will be understood our invention is not limited to the type of mold illustrated since any suitable means may be used to shape the strip 5 to desired contour about the core 3.

It is essential in our invention that the composition used as an outer coating be plastic and moldable so as to be easily disposed about the core, and be capable of setting to form a relatively hard coating so as to withstand impact and abrasive action. Such plastic composition may be formed of any suitable material having the characteristics required for the purpose; preferably, it is formed of cork particles held together by a binder composed of ethyl cellulose, a suitable plasticizer and a volatile solvent. A satisfactory binder composition may be formulated as follows:

| | Parts by weight |
|---|---|
| Ethyl cellulose | 100 |
| Plasticizer | 20 to 40 |
| Solvent | 100 to 200 |

In place of ethyl cellulose, cellulose nitrate, cellulose acetate or other suitable plastic binders may be used. If desired, extenders for the binder such as rosin or Vinsol (oxidized rosin acids) may be used. The solvent is a mixture of alcohol and toluol, although any suitable volatile solvents may be used. The plasticizer may be methyl abietate, although other plasticizers, such as tributyl phthalate, tributyl phosphate, or castor oil may be used as is well known in the industry.

As pointed out above, such plastic composition may be formed by mixing the cork particles and binder together in a suitable mixer, then extruding the plastic composition to form a plastic moldable strip, sheet, or ribbon 5. The strip 5 is disposed about the core 3, the wrapped core disposed in mold 7 and the plastic composition shaped to desired contour. With the binder disclosed above, the shaped article may be disposed on a rack to dry and set the binder by evaporation of the solvent. Evaporation of the solvent forms a thin, relatively hard coating about the core. To expedite drying, the shaped article may be placed in a heated oven.

It will be understood, of course, the cold plastic mass of cork composition may be spread, shaped or applied by any desirable means about the cork composition core. We have found that most satisfactory results are obtained by shaping the cold plastic mass into a thin strip and wrapping the strip about the core. Such procedure is expeditious and obviates waste since the strip may be severed into a desired length for wrapping about the core. If desired, the core may be disposed in a mold and the cold plastic mass packed thereabout, then shaped to desired contour by the application of pressure.

While we have described our invention with particular reference to the use of a cold plastic mass having a binder dissolved in a volatile solvent, it will be understood binders adapted to be set by the application of heat may be used with satisfactory results. The only requirement is that the cork composition mass be plastic and adapted to be shaped to desired contour about the core. It will be understood the binder of the plastic composition is sufficient to adhere the strip to the core and an additional adhesive or binder is not required.

After the cork cartridge plug has been formed as described above, the hard coating may be ground or buffed to remove irregularities and to finish it to desired dimensions.

The chief advantage of our invention resides in the elimination of the waste heretofore deemed necessary in the manufacture of cork composition cartridge plugs. Our invention not only eliminates waste in the manufacture of cork composition cartridge plugs, but eliminates various machining operations heretofore deemed essential and thus aids in lowering the cost of the finished product.

While we have described and illustrated a preferred embodiment of our invention, it will be understood our invention is not limited thereto since it may be otherwise embodied or practiced within the scope of the following claims.

We claim:

1. In the method of making composition cork cartridge plugs having an inner shaped corkboard core and a thin, relatively hard cork composition outer layer thereon, the steps which comprise wrapping a strip of plastic cork composition formed of cork granules and a binder about a shaped corkboard core, pressing the plastic cork composition to desired contour without substantial compression of said core, and hardening the cork composition binder to form a thin, relatively hard coating about said corkboard core.

2. In the method of making composition cork cartridge plugs, the steps which comprise wrapping a strip of plastic cork composition about a shaped corkboard core, placing the wrapped core in a mold, pressing the plastic composition to desired contour without substantial compression of said core, and hardening the composition to form a thin, relatively hard coating about said core.

3. In the method of making composition cork cartridge plugs, the steps which comprise forming cork particles, a binder, and a solvent for the binder into a strip of plastic cork composition, wrapping said strip about a shaped corkboard core, the binder of said plastic composition adhering the strip to said core, placing the wrapped core in a mold, pressing the plastic composition to desired contour without substantial compression of said core, and evaporating the solvent to form a thin, relatively hard coating about said core.

4. A method according to claim 3 in which the binder is composed of ethyl cellulose and a plasticizer therefor dissolved in a volatile solvent.

5. In the method of making cork composition cartridge plugs, the steps which comprise forming cork particles and a heat-settable binder into a strip of plastic cork composition, wrapping said strip about a shaped core, placing the wrapped core in a mold, pressing the plastic composition to desired contour, and heating the shaped article to form a thin, relatively hard coating about said core.

HERBERT PASCHKE.
JOHN W. WILEY.